US011430585B2

(12) United States Patent
Iida et al.

(10) Patent No.: US 11,430,585 B2
(45) Date of Patent: Aug. 30, 2022

(54) INSULATED CONDUCTOR AND INSULATED CONDUCTOR MANUFACTURING METHOD

(71) Applicant: MITSUBISHI MATERIALS CORPORATION, Tokyo (JP)

(72) Inventors: Shintaro Iida, Amagasaki (JP); Hideaki Sakurai, Amagasaki (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 300 days.

(21) Appl. No.: 16/758,505

(22) PCT Filed: Nov. 20, 2018

(86) PCT No.: PCT/JP2018/042816
§ 371 (c)(1),
(2) Date: Apr. 23, 2020

(87) PCT Pub. No.: WO2019/102991
PCT Pub. Date: May 31, 2019

(65) Prior Publication Data
US 2020/0251255 A1 Aug. 6, 2020

(30) Foreign Application Priority Data

Nov. 21, 2017 (JP) .............................. JP2017-223536
Nov. 16, 2018 (JP) .............................. JP2018-215925

(51) Int. Cl.
*H01B 7/02* (2006.01)
*H01B 13/00* (2006.01)
*H01B 3/44* (2006.01)

(52) U.S. Cl.
CPC ......... *H01B 13/0016* (2013.01); *H01B 3/445* (2013.01); *H01B 7/02* (2013.01); *H01B 13/0036* (2013.01)

(58) Field of Classification Search
CPC ... H01B 7/02; H01B 7/04; H01B 7/06; H01B 7/08; H01B 13/02; H01B 13/0016; H01B 13/0036; H01B 3/445
(Continued)

(56) References Cited

FOREIGN PATENT DOCUMENTS

| CN | 103814319 A | 5/2014 |
| CN | 205542046 U | 8/2016 |

(Continued)

OTHER PUBLICATIONS

International Search Report dated Feb. 2, 2021, issued for Chinese Patent Application No. 201880074817.X and an English translation of the Search Report.
(Continued)

*Primary Examiner* — William H. Mayo, III
(74) *Attorney, Agent, or Firm* — Locke Lord LLP (57) ABSTRACT

An insulated conductor having a conductor and an insulating film provided on a surface of the conductor, in which the insulating film has a fluorine-containing resin composition layer including a cured product of a thermosetting resin and a fluororesin and a fluorine concentration gradient layer which is disposed between the conductor and the fluorine-containing resin composition layer. The fluorine-containing resin composition layer includes a cured product of a thermosetting resin and a fluororesin, and is provided with a concentration gradient in which a fluorine atom content decreases from the fluorine-containing resin composition layer side toward the conductor.

11 Claims, 4 Drawing Sheets

(58) Field of Classification Search
USPC .................................. 174/36, 110 R–110 PM
See application file for complete search history.

(56) References Cited

FOREIGN PATENT DOCUMENTS

| | | | | |
|---|---|---|---|---|
| EP | 0972805 | A2 | 1/2000 | |
| EP | 3716292 | A1 | 9/2020 | |
| JP | 02-037619 | A | 2/1990 | |
| JP | 10-334739 | A | 12/1998 | |
| JP | 0972805 | A2 * | 7/1999 | .............. C08L 79/08 |
| JP | 2001-508588 | A | 6/2001 | |
| JP | 2002-298674 | A | 10/2002 | |
| JP | 2003-151754 | A | 5/2003 | |
| JP | 2005-259419 | A | 9/2005 | |
| JP | 2006-004681 | A | 1/2006 | |
| JP | 2010-100905 | A | 5/2010 | |
| JP | 2013-187029 | A | 9/2013 | |
| WO | 98/31022 | A1 | 7/1998 | |
| WO | 2011/024809 | A1 | 3/2011 | |

OTHER PUBLICATIONS

International Search Report dated Jan. 8, 2019, issued for PCT/JP2018/042816 and English translation thereof.
Supplementary European Search Report dated Jul. 12, 2021, issued for European Patent Application No. 18880525.3.
Office Action dated Apr. 26, 2022, issued for Taiwanese Patent Application No. 107141422 and a machine English translation obtained on Jun. 13, 2022.

* cited by examiner

INSULATED CONDUCTOR AND INSULATED CONDUCTOR MANUFACTURING METHOD

TECHNICAL FIELD

The present invention relates to an insulated conductor and an insulated conductor manufacturing method.

Priority is claimed on Japanese Patent Application No. 2017-223536, filed Nov. 21, 2017, and Japanese Patent Application No. 2018-215925, filed Nov. 16, 2018, the contents of which are incorporated herein by reference.

BACKGROUND ART

Insulated conductors obtained by coating a conductor such as a copper wire with an insulating film are used for electric coils for a variety of electric devices such as a motor or a transformer. As a material of the insulating film of the insulated conductor, thermosetting resins, particularly, polyimide-based resins such as a polyamide-imide or a polyimide are broadly used.

In response to an increase in the power of electric devices in recent years, voltage applied to an insulated conductor tends to increase. Therefore, there is a desire for an insulated conductor in which partial discharge does not easily occur. In order to suppress the occurrence of partial discharge in the insulated conductor, it is effective to increase the partial discharge inception voltage.

Patent Literature 1 describes, as a method for manufacturing an insulated conductor having a high partial discharge inception voltage, a method in which, when an insulating coating containing a thermosetting resin and a bubble forming agent is applied onto a conductor and baked, the decomposition and evaporation of the bubble forming agent are carried out at the same time as a curing reaction of the thermosetting resin.

In addition, Patent Literature 2 describes an insulated conductor having an insulating layer that is made up of a thermosetting resin and a fluororesin and in which the mass ratio between the thermosetting resin and the fluororesin is 90:10 to 10:90. In Patent Literature 2, as the insulating layer, a layer formed by mixing a thermosetting resin solution and a fluororesin organosol, applying the obtained liquid mixture onto a conductor, and baking the liquid mixture is used. Patent Literature 2 describes that, when the insulating layer is formed from the liquid mixture obtained by mixing the thermosetting resin solution and the fluororesin organosol, a thermosetting resin and a fluororesin are uniformly dispersed in the insulating layer.

Patent Literature 3 describes an electric insulated wire in which an insulating film provided on a conductor is formed of at least two kinds of resin components and an interface between the two or more kinds of resins does not have a clear interface, but has an interface having a concentration of the resin component that changes continuously or stepwise. In Patent Literature 3, a fluororesin is described as the resin component. In addition, in Patent Literature 3, as an electric insulated wire manufacturing method, a method including a step of forming an extruded coating layer on the surface of an electric wire provided with a conductor or an insulating layer using a melt obtained by melting and mixing at least two kinds of thermoplastic resins and then, or simultaneously, holding the extruded coating layer for a certain period of time at a temperature lower than the melting point or softening point of a resin having the highest melting point or softening point among the thermoplastic resins by 0° C. to 100° C. is described.

CITATION LIST

Patent Literature

[Patent Literature 1]
Japanese Unexamined Patent Application, First Publication No. 2013-187029
[Patent Literature 1]
PCT International Publication No. WO2011/024809
[Patent Literature 1]
Japanese Unexamined Patent Application, First Publication No. 2005-259419

SUMMARY OF INVENTION

Technical Problem

In insulated conductors, the adhesion between a conductor and an insulating film is desirably favorable such that the insulating property of the conductor by the insulating film can be maintained for a long period of time. However, the insulated conductor described in Patent Literature 1 has pores in the insulating film, and thus there is a concern that the adhesion between the conductor and the insulating film may degrade.

In addition, the addition of a fluororesin to the insulating layer as described in Patent Literature 2 and 3 is effective for the improvement of the lubricity of the surface of the insulating film. However, a fluororesin and resins other than the fluororesin have a low affinity to each other, and thus there is a problem in that a large crack is easily generated between the fluororesin and resins other than the fluororesin.

The present invention has been made in consideration of the above-described circumstance, and an object of the present invention is to provide an insulated conductor in which partial discharge does not easily occur, the adhesion between an insulating film and a conductor is excellent, and a crack is not easily generated and a manufacturing method thereof.

Solution to Problem

In order to achieve the above-described objects, an insulated conductor of the present invention is an insulated conductor including: a conductor; and an insulating film provided on a surface of the conductor, in which the insulating film has a fluorine-containing resin composition layer including a cured product of a thermosetting resin and a fluororesin and a fluorine concentration gradient layer which is disposed between the conductor and the fluorine-containing resin composition layer, includes a cured product of a thermosetting resin and a fluororesin, and is provided with a concentration gradient in which a fluorine atom content decreases from the fluorine-containing resin composition layer side toward the conductor.

According to the insulated conductor of the present invention configured as described above, the fluorine-containing resin composition layer of the insulating film includes a cured product of a thermosetting resin and a fluororesin, and thus the relative permittivity decreases. Therefore, the partial discharge inception voltage of the insulating film increases. In addition, the fluorine concentration gradient layer disposed between the conductor and the fluorine-containing resin composition layer is provided with a concentration gradient in which the fluorine atom content decreases from the fluorine-containing resin composition layer side toward the conductor, and the fluorine concentration gradient layer has a common composition with the fluorine-containing resin composition layer on the fluorine-containing resin composition layer side, and thus the adhesion to the fluorine-containing resin composition layer becomes favorable, and a crack is not easily generated between the fluorine-containing resin composition layer and the concentration gradient layer. Furthermore, the fluorine-containing resin composition layer and the fluorine concentration gradient layer include a cured product of a thermosetting resin and are thus not easily distorted by heat and are capable of maintaining favorable adhesion between the fluorine-containing resin composition layer and the fluorine concentration gradient layer even at a high temperature. On the other hand, the content of the fluororesin having poor adhesion to the conductor is low on the conductor side of the fluorine concentration gradient layer, and thus the adhesion to the conductor becomes favorable. Therefore, the adhesion between the insulating film and the conductor improves.

Here, in the insulated conductor of the present invention, it is preferable that the fluororesin included in the fluorine-containing resin composition layer is a thermoplastic resin, and the fluororesin included in the fluorine concentration gradient layer is a thermoplastic resin.

In this case, the fluororesins included in the fluorine-containing resin composition layer and the fluorine concentration gradient layer have a low surface free energy and have poor compatibility with the thermosetting resin and thus move toward the surface of the insulating film by being heated, and thus the content of the fluororesin on the conductor side of the fluorine concentration gradient layer more reliably decreases, and the adhesion between the insulating film and the conductor becomes more favorable.

In addition, in the insulated conductor of the present invention, it is preferable that the fluorine-containing resin composition layer has a sea-island structure made up of a sea phase including the cured product of the thermosetting resin and an island phase including the fluororesin dispersed in the sea phase.

In this case, the fluorine-containing resin composition layer has a discontinuous sea-island structure divided into a sea phase including the cured product of the thermosetting resin and an island phase including the fluororesin, and thus a crack between the cured product of the thermosetting resin and the fluororesin does not easily grow, and the generation of a large crack becomes more difficult.

In addition, in the insulated conductor of the present invention, it is preferable that a difference between a fluorine atom content at a place with a lowest fluorine atom content in the fluorine concentration gradient layer and a fluorine atom content in a central region in a thickness direction of the fluorine-containing resin composition layer is 10 atom % or more.

In this case, the fluorine atom content at the place with the lowest fluorine atom content in the fluorine concentration gradient layer is lower than the fluorine atom content in the central region in the thickness direction of the fluorine-containing resin composition layer by 10 atom % or more, and the difference in the fluorine atom content between the fluorine-containing resin composition layer and the fluorine concentration gradient layer becomes large, and thus the adhesion between the insulating film and the conductor reliably improves.

In addition, in the insulated conductor of the present invention, it is preferable that the fluorine atom content at the place with the lowest fluorine atom content in the fluorine concentration gradient layer is 15 atom % or less.

In this case, the fluorine atom content at the place with the lowest fluorine atom content in the fluorine concentration gradient layer is as low as 15 atom % or less, and thus the adhesion between the insulating film and the conductor further improves.

In addition, in the insulated conductor of the present invention, it is preferable that the place with the lowest fluorine atom content in the fluorine concentration gradient layer is in a range of 3 μm or less from the surface of the conductor.

In this case, the place with the lowest fluorine atom content in the fluorine concentration gradient layer is as close to the surface of the conductor as 3 μm or less, and thus the adhesion between the insulating film and the conductor further improves.

In addition, in the insulated conductor of the present invention, it is preferable that the fluorine atom content in the central region in the thickness direction of the fluorine-containing resin composition layer is in a range of 20 mass % or more and 70 mass % or less.

In this case, the fluorine atom content in the fluorine-containing resin composition layer is in a range of 20 mass % or more and 70 mass % or less, and thus the relative permittivity reliably decreases, and the partial discharge inception voltage reliably increases.

In addition, in the insulated conductor of the present invention, it is preferable that the fluorine-containing resin composition layer and the fluorine concentration gradient layer are a continuous phase.

In this case, the fluorine-containing resin composition layer and the fluorine concentration gradient layer are a continuous phase, and fluorine-containing resin composition layer and the fluorine concentration gradient layer do not easily exfoliate from each other, and thus the adhesion between the insulating film and the conductor more reliably improves.

In addition, in the insulated conductor of the present invention, it is preferable that a thickness of the fluorine concentration gradient layer is in a range of 2 μm or more and 15 μm or less.

In this case, the thickness of the fluorine concentration gradient layer is in a range of 2 μm or more and 15 μm or less, and thus it is possible to improve both the adhesion between the conductor and the fluorine concentration gradient layer and the adhesion between the fluorine concentration gradient layer and the fluorine-containing resin composition layer, whereby it is possible to further improve the adhesion between the insulating film and the conductor.

An insulated conductor manufacturing method of the present invention is an insulated conductor manufacturing method for manufacturing the above-described insulated conductor, the method comprising: an electrodeposition step of electrodepositing an electrodeposition liquid including thermosetting resin particles and fluororesin particles to a surface of the conductor to obtain an electrodeposition layer-attached conductor; and a drying step of heating and drying the electrodeposition layer-attached conductor at a temperature in a range of (a melting point of the fluororesin particles−40° C.) to (the melting point of the fluororesin particles+30° C.).

According to the insulated conductor manufacturing method of the present invention configured as described above, in the drying step, the electrodeposition layer-attached conductor is heated at a temperature in a range of (the melting point of the fluororesin particles−40° C.) to (the melting point of the fluororesin particles+30° C.), and thus it is possible to move the fluororesin present on the surface of the conductor to the outside, whereby it is possible to manufacture an insulating film-attached conductor (insulated conductor) having the fluorine-containing resin composition layer and the fluorine concentration gradient layer.

Here, in the insulated conductor manufacturing method of the present invention, it is preferable that the heating time in the drying step is five minutes or longer.

In this case, the heating time in the drying step is set to five minutes or longer, and thus it is possible to move a larger amount of the fluororesin present on the surface of the conductor to the outside, whereby it becomes possible to more reliably manufacture an insulated conductor having a fluorine-containing resin composition layer and a fluorine concentration gradient layer.

Advantageous Effects of Invention

According to the present invention, it becomes possible to provide an insulated conductor in which partial discharge does not easily occur, the adhesion between an insulating film and a conductor is excellent, and a crack is not easily generated and a manufacturing method thereof.

DESCRIPTION OF EMBODIMENTS

Next, an insulated conductor and an insulated conductor manufacturing method which are an embodiment of the present invention will be described with reference to the accompanying drawings.

<Insulated Conductor>

Figure 1:
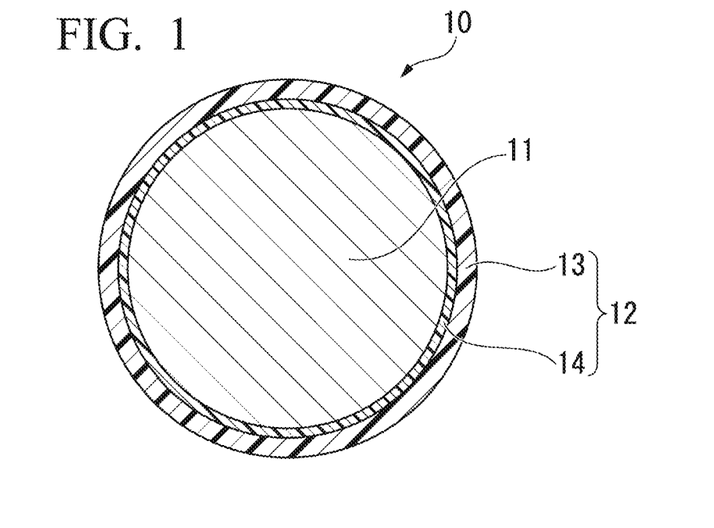
FIG. 1 is a transverse sectional view of an insulated conductor which is an embodiment of the present invention.

FIG. 1 is a transverse sectional view of an insulated conductor which is an embodiment of the present invention.

An insulated conductor 10 of the present embodiment has a conductor 11 and an insulating film 12 provided on the surface of the conductor 11 as shown in FIG. 1.

[Conductor]

The material of the conductor 11 is preferably metal having a favorable conductive property such as copper, a copper alloy, aluminum, or an aluminum alloy. The conductor 11 shown in FIG. 1 has a cross section shaped like a round metal wire, but the cross-sectional shape of the conductor 11 is not particularly limited and may be, for example, an elliptical shape or a square shape. In addition, the conductor 11 may be a metal plate.

[Insulating Film]

The insulating film 12 has a fluorine-containing resin composition layer 13 and a fluorine concentration gradient layer 14 disposed between the conductor 11 and the fluorine-containing resin composition layer 13. The fluorine-containing resin composition layer 13 includes a cured product of a thermosetting resin and a fluororesin. The fluorine concentration gradient layer 14 is provided with a concentration gradient in which the fluorine atom content decreases from the fluorine-containing resin composition layer 13 side toward the conductor 11.

(Fluorine-Containing Resin Composition Layer)

The fluorine-containing resin composition layer 13 has an action of insulating the conductor 11.

The fluorine-containing resin composition layer 13 includes a cured product of a thermosetting resin and a fluororesin. The fluororesin in the fluorine-containing resin composition layer 13 has an effect for reducing the relative permittivity of the fluorine-containing resin composition layer 13, increasing the partial discharge inception voltage, and suppressing the occurrence of partial discharge.

The fluororesin is preferably a thermoplastic resin having a melting point lower than the decomposition temperature of the cured product of the thermosetting resin. The melting point of the fluororesin is preferably in a range of 250° C. or higher and 350° C. or lower. The fluororesin may be a homopolymer or a copolymer. As examples of the fluororesin, perfluoroalkoxy fluororesin (PFA), polytetrafluoroethylene (PTFE), and ethylenetetrafluoride-propylene hexafluoride copolymer (FEP) can be exemplified. These fluororesins may be used singly or two or more fluororesins may be used in combination.

The thermosetting resin is preferably a resin having any one or both of an imide bond and an amide bond. As examples of the thermosetting resin, a polyamide-imide resin, a polyimide resin, a polyamic acid resin, a polyamide resin, a polyether-imide resin, and a polyester-imide resin can be exemplified. These thermosetting resins may be used singly or two or more thermosetting resins may be used in combination. The thermosetting resin is particularly preferably a polyimide-based resin (polyamide-imide resin or polyimide resin) having an imide bond.

The thickness of the fluorine-containing resin composition layer 13 is preferably in a range of 5 μm or more and 100 μm or less. When the thickness of the fluorine-containing resin composition layer 13 is in this range, it is possible to reduce the relative permittivity without impairing the flexibility of the insulating film 12.

In the fluorine-containing resin composition layer 13, the fluorine atom content in a central region in the thickness direction is preferably in a range of 10 atom % or more and 50 atom % or less and more preferably in a range of 20 atom % or more and 40 atom % or less. When the fluorine atom content is in this range, it is possible to reduce the relative permittivity of the fluorine-containing resin composition layer 13 without impairing the flexibility of the insulating film 12. The central region in the thickness direction of the fluorine-containing resin composition layer 13 refers to a range from a location ¼ of the thickness of the fluorine-containing resin composition layer 13 apart from the center in the thickness direction of the fluorine-containing resin composition layer 13 toward the conductor 11 side to a location ¼ of the thickness of the fluorine-containing resin composition layer 13 apart from the center toward a side opposite to the conductor 11 side. For example, in a case where the thickness of the fluorine-containing resin composition layer 13 is 40 μm, the central region is a range from a location 10 μm apart from the center in the thickness direction of the fluorine-containing resin composition layer 13 toward the conductor 11 side to a location 10 µm apart from the center toward the side opposite to the conductor 11 side.

In the fluorine-containing resin composition layer 13, the fluorine atom content is preferably uniform. Specifically, the difference between the highest value and the lowest value of the fluorine atom content in the central region in the thickness direction of the fluorine-containing resin composition layer 13 is preferably 5 atom % or less. When the fluorine atom content of the fluorine-containing resin composition layer 13 is uniform, the relative permittivity of the fluorine-containing resin composition layer 13 becomes uniform, and thus partial discharge does not easily occur.

Here, in the present embodiment, the fluorine atom content of the fluorine-containing resin composition layer 13 refers to the proportion of the number of fluorine atoms in the total number of atoms of all elements included in the fluorine-containing resin composition layer 13. For example, in a case where the conductor 11 is made of copper, and the fluorine-containing resin composition layer 13 is made of a polyamide-imide and a fluororesin, the fluorine atom content refers to the proportion of the number of fluorine (F) atoms in the total number of atoms of fluorine (F), carbon (C), nitrogen (N), oxygen (O), and copper (Cu) included in the fluorine-containing resin composition layer 13. The fluorine atom content in the central region in the thickness direction of the fluorine-containing resin composition layer 13 can be obtained by, for example, linearly analyzing the contents of individual elements along the thickness direction of the fluorine-containing resin composition layer 13 and computing the content of individual elements included in the central region.

The fluorine-containing resin composition layer 13 preferably has a sea-island structure including a sea phase (matrix phase) including the cured product of the thermosetting resin and an island phase (domain phase) including the fluororesin dispersed in the sea phase. The fact that the fluorine-containing resin composition layer 13 has a sea-island structure can be confirmed using a scanning electron microscope (SEM) and an energy-dispersive X-ray spectroscopy (EDS) analyzer. For example, in a case where a cross section of the fluorine-containing resin composition layer 13 is observed using a SEM-EDS analyzer and a continuous portion from which no fluorine is detected (sea phase) and a portion from which granular fluorine is detected (island shape) are confirmed, it can be said that the fluorine-containing resin composition layer 13 has a sea-island structure.

The shape of the island phase is not particularly limited and can be a spherical shape, an elliptically spherical shape, a conic shape, a polygonal shape, a plate shape, a cylindrical shape, a polygonal column shape, and a shape obtained by combining the above-described shaped. The shape of the island phase may be a neck shape or gourd shape having a narrow necked portion between thick portions. The island phase in the necked shape or the gourd shape has a large contact area with the sea phase and improves in the adhesion to the sea phase, and thus the shape stability of the entire low-concentration fluorine layer 13 becomes favorable.

(Fluorine Concentration Gradient Layer)

The fluorine concentration gradient layer 14 has an action for improving the adhesion between the conductor 11 and the insulating film 12.

The fluorine concentration gradient layer 14 includes a thermosetting resin and a fluororesin. The fluorine concentration gradient layer 14 is provided with a concentration gradient in which the fluorine atom content decreases from the fluorine-containing resin composition layer 13 side toward the conductor 11, and the content of the fluororesin having poor adhesion to the conductor 11 becomes relatively low compared with the fluorine concentration gradient layer 14, and thus the adhesion between the conductor 11 and the fluorine concentration gradient layer 14 becomes favorable. In addition, the concentration gradient is provided, and thus the adhesion between the fluorine concentration gradient layer 14 and the fluorine-containing resin composition layer 13 also becomes favorable. Therefore, the adhesion between the conductor 11 and the insulating film 12 improves. In addition, the thermosetting resin and the fluororesin included in the fluorine concentration gradient layer 14 are preferably the same as the thermosetting resin and the fluororesin included in the fluorine-containing resin composition layer 13. In addition, the fluorine-containing resin composition layer 13 and the fluorine concentration gradient layer 14 include the same thermosetting resin and the same fluororesin, whereby the adhesion between the fluorine-containing resin composition layer 13 and the fluorine concentration gradient layer 14 becomes favorable, and the flexibility improves.

A difference (B−A) when the fluorine atom content at a place with the lowest fluorine atom content in the fluorine concentration gradient layer 14 (hereinafter, also referred to as the "lowest fluorine atom content") is represented by A atom % and the fluorine atom content in a central region in the thickness direction of the fluorine-containing resin composition layer 13 is represented by B atom % is preferably 10 atom % or more. When this difference (B−A) is less than 10 atom %, there is a concern that the adhesion between the conductor 11 and the fluorine concentration gradient layer 14 may not sufficiently improve. However, when the difference (A−B) becomes large, there is a concern that the adhesion between the fluorine concentration gradient layer 14 and the fluorine-containing resin composition layer 13 may degrade. Therefore, the difference (B−A) is preferably 20 atom % or less.

The lowest fluorine atom content in the fluorine concentration gradient layer 14 can be obtained by, for example, linearly analyzing the contents of individual elements along the thickness direction of the fluorine concentration gradient layer 14, detecting a place having the lowest content of fluorine, and computing the fluorine atom content.

In addition, the lowest fluorine atom content in the fluorine concentration gradient layer 14 is preferably 15 atom % or less. When the lowest fluorine atom content in the fluorine concentration gradient layer 14 exceeds 15 atom %, there is a concern that the adhesion between the conductor 11 and the fluorine concentration gradient layer 14 may not sufficiently improve. On the other hand, when the lowest fluorine atom content in the fluorine concentration gradient layer 14 becomes too low, and the difference from the fluorine atom content of the fluorine-containing resin composition layer 13 becomes large, there is a concern that the adhesion between the fluorine concentration gradient layer 14 and the fluorine-containing resin composition layer 13 may degrade. Therefore, the lowest fluorine atom content in the fluorine concentration gradient layer 14 is preferably 5 atom % or more.

The place with the lowest fluorine atom content in the fluorine concentration gradient layer 14 may not be a portion in which the fluorine concentration gradient layer 14 is in contact with the surface of the conductor 11. That is, in the portion in which the fluorine concentration gradient layer 14 is in contact with the surface of the conductor 11, the fluorine atom content may be higher than the lowest fluorine atom content. However, when the place with the lowest fluorine atom content in the fluorine concentration gradient layer 14 is too far away from the surface of the conductor 11, there is a concern that the adhesion between the fluorine concentration gradient layer 14 and the fluorine-containing resin composition layer 13 may degrade. Therefore, the place with the lowest fluorine atom content in the fluorine concentration gradient layer 14 is preferably in a range of 3 μm or less from the surface of the conductor 11.

The fluorine-containing resin composition layer 13 and the fluorine concentration gradient layer 14 may be a discontinuous phase, but are preferably a continuous phase, that is, the fluorine atom content of the fluorine concentration gradient layer 14 preferably continuously increases relative to the fluorine atom content of the fluorine-containing resin composition layer 13.

The boundary between the fluorine-containing resin composition layer 13 and the fluorine concentration gradient layer 14 is a location at which the concentration of fluorine changes discontinuously in a case where the fluorine-containing resin composition layer 13 and the fluorine concentration gradient layer 14 are not a continuous phase. In addition, in a case where the fluorine-containing resin composition layer 13 and the fluorine concentration gradient layer 14 are a continuous phase, the boundary between the fluorine-containing resin composition layer 13 and the fluorine concentration gradient layer 14 is a location at which the fluorine atom content of the fluorine concentration gradient layer 14 becomes lower than the fluorine atom content in the central region in the thickness direction of the fluorine-containing resin composition layer 13 by 2 atom %.

The thickness of the fluorine concentration gradient layer 14 is preferably in a range of 2 μm or more and 15 μm or less. When the thickness of the fluorine concentration gradient layer 14 is less than 2 μm, there is a concern that it may become difficult to improve both the adhesion between the conductor 11 and the fluorine concentration gradient layer 14 and the adhesion between the fluorine concentration gradient layer 14 and the fluorine-containing resin composition layer 13. On the other hand, when the thickness of the fluorine concentration gradient layer 14 exceeds 15 μm, the effect for improving both the adhesion between the conductor 11 and the fluorine concentration gradient layer 14 and the adhesion between the fluorine concentration gradient layer 14 and the fluorine-containing resin composition layer 13 is saturated, and the thickness of the fluorine-containing resin composition layer 13 becomes relatively thin, and thus there is a concern that the relative permittivity of the insulating film 12 may decrease as a whole.

<Insulated Conductor Manufacturing Method>

Figure 2:
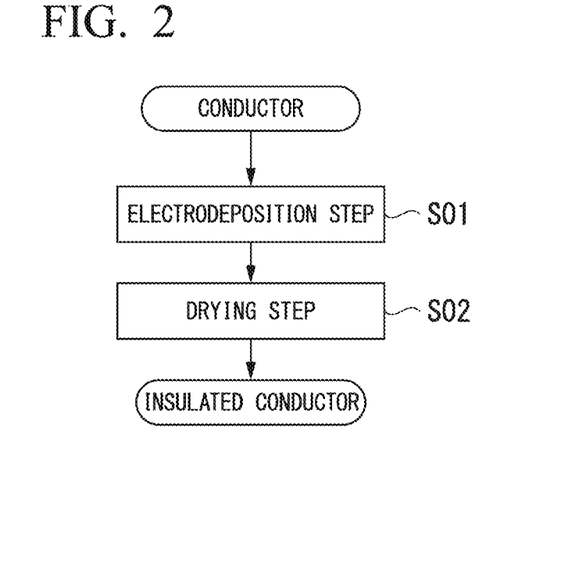
FIG. 2 is a flowchart of an insulated conductor manufacturing method which is an embodiment of the present invention.

FIG. 2 is a flowchart of an insulated conductor manufacturing method which is an embodiment of the present invention.

The insulated conductor manufacturing method of the present embodiment includes an electrodeposition step S01 of obtaining an electrodeposition layer-attached conductor by electrodepositing an electrodeposition liquid including thermosetting resin particles and fluororesin particles to a surface of the conductor and a drying step S02 of heating and drying the electrodeposition layer-attached conductor as shown in FIG. 2.

[Electrodeposition Step]

In the electrodeposition step S01, an electrodeposition liquid including thermosetting resin particles and thermoplastic fluororesin particles is electrodeposited on the surface of the conductor, thereby obtaining an electrodeposition layer-attached conductor. Here, regarding the electrodeposition liquid, a case where the thermosetting resin particles are polyimide-based resin particles having an imide bond will be described as an example (Electrodeposition Liquid)

The electrodeposition liquid is made up of a dispersion medium and a solid content. The solid content includes polyimide-based resin particles and fluororesin particles.

The content proportion of the fluororesin particles in the solid content is preferably in a range of 20 mass % or more and 70 mass % or less and more preferably in a range of 30 mass % or more and 70 mass % or less. In addition, the median diameter of the polyimide-based resin particles is preferably in a range of 50 nm or more and 400 nm or less and more preferably in a range of 50 nm or more and 200 nm or less. In addition, the median diameter of the fluororesin particles is preferably in a range of 50 nm or more and 500 nm or less. Furthermore, the polyimide-based resin particles preferably have a smaller median diameter than the fluororesin particles. Here, the reason for setting the preferred content proportion of the fluororesin particles in the solid content in a range of 20 mass % or more and 70 mass % or less is that, at a content proportion of less than 20 mass %, it is not possible to decrease the relative permittivity of the insulating film, and, at a content proportion of more than 70 mass %, it becomes difficult for the insulating film to form a sea-island structure. In addition, the reason for setting the preferred median diameter of the polyimide-based resin particles in a range of 50 nm or more and 400 nm or less is that, at a median diameter of less than 50 nm, the amount of the dispersion medium present between the resin particles in an electrodeposition layer formed by electrodeposition is small, and the resistance of the electrodeposition layer becomes large, and thus the electrodeposition rate becomes slow, and a long time is required to obtain an electrodeposition layer having a large thickness, and, at a median diameter of more than 400 nm, the dispersion stability of the electrodeposition liquid degrades. Furthermore, the reason for setting the preferred median diameter of the fluororesin particles in a range of 50 nm or more and 500 nm or less is that, at a median diameter of less than 50 nm, the amount of the dispersion medium present between the resin particles in the electrodeposition layer formed by electrodeposition is small, and the resistance of the electrodeposition layer becomes large, and thus the electrodeposition rate becomes slow, and a long time is required to obtain an electrodeposition layer having a large thickness, and, at a median diameter of more than 500 nm, the electrodeposition liquid agglomerate, sedimentation occurs, and the dispersion stability degrades.

The dispersion medium preferably includes a polar solvent, water, and a base. In addition, the polar solvent preferably has a higher boiling point than water. As the polar solvent, organic solvents such as N-methyl-2-pyrrolidone, 1,3-dimethyl-2-imidazolidinone, dimethyl sulfoxide, and N,N dimethylacetamide are exemplified. Furthermore, as the base, tri-n-propylamine, dibutylamine, piperidine, triethylamine, and the like are exemplified. The content proportion of water in the dispersion medium is preferably in a range of 10 mass % or more and 40 mass % or less and more preferably in a range of 18 mass % or more and 30 mass % or less. In addition, the content proportion of the polar solvent in the dispersion medium is preferably in a range of 60 mass % or more and 90 mass % or less, and the content proportion of the base in the dispersion medium is preferably in a range of 0.01 mass % or more and 0.3 mass % or less. Furthermore, the content proportion of the solid content in the electrodeposition liquid is preferably in a range of 1 mass % or more and 10 mass % or less.

Here, the reason for setting the preferred content proportion of water in the dispersion medium to 10 mass % or more and 40 mass % or less is that, at a content proportion of less than 10 mass %, the conductivity of the electrodeposition liquid is small, and the electrodeposition layer cannot be formed by electrodeposition, and, at a content proportion of more than 40 mass %, the volatilization rate of the dispersion medium during the drying of the electrodeposition liquid becomes fast, and, when the electrodeposition layer is formed to be thick, bubbles are likely to be generated in the electrodeposition layer. In addition, the reason for setting the preferred content proportion of the polar solvent in the dispersion medium is preferably in a range of 60 mass % or more and 90 mass % or less is that, at a content proportion of less than 60 mass %, the proportion of water in the dispersion medium becomes large, the volatilization rate becomes fast, and bubbles are likely to be generated, and, at a content proportion of more than 90 mass %, the proportion of water in the dispersion medium decreases, the electrodeposition rate becomes slow, and a long time is required to obtain an electrodeposition layer having a thick film. In addition, the reason for setting the preferred content proportion of the base in the dispersion medium in a range of 0.01 mass % or more and 0.3 mass % or less is that, at a content proportion of less than 0.01 mass %, the median diameter of the polyimide-based resin particles increases, and the dispersion stability deteriorates, and, at a content proportion of more than 0.3 mass %, the median diameter of the polyimide-based resin particles decreases, the amount of the dispersion medium present between the resin particles in the electrodeposition layer formed by electrodeposition is small, and the resistance of the electrodeposition layer becomes large, and thus the electrodeposition rate becomes slow, and a long time is required to obtain an electrodeposition layer having a large thickness. Furthermore, the reason for setting the preferred content proportion of the solid content in the electrodeposition liquid in a range of 1 mass % or more and 10 mass % or less is that, at a content proportion of less than 1 mass %, the electrodeposition rate becomes slow, and a long time is required to obtain an electrodeposition layer having a large thickness, and, at a content proportion of more than 10 mass %, the dispersion stability deteriorates. The median diameter of the polyimide-based resin particles and the median diameter of the fluororesin particles are volume-based average particle diameters measured using a dynamic light scattering particle size distribution analyzer (LB-550 manufactured by Horiba, Ltd.).

Next, a manufacturing method of the electrodeposition liquid will be described.

(Synthesis of Polyimide-Based Resin Varnish)

First, in a two-liter four-neck flask including a stirrer, a cooling pipe, a nitrogen introduction pipe, and a thermometer, the polar solvent, an isocyanate component, and an acid component are mixed together, heated to a temperature of 80° C. to 130° C., held at this temperature for two to eight hours to be reacted with each other, thereby obtaining a polyimide-based resin. Here, as the isocyanate component, aromatic diisocyanates such as diphenylmethane-4,4'-diisocyanate (MDI), diphenylmethane-3,3'-diisocyanate, diphenylmethane-3,4'-diisocyanate, diphenylether-4,4'-diisocyanate, benzophenone-4,4'-diisocyanate, and diphenylsulfone-4,4'-diisocyanate and the like are exemplified, and, as the acid component, trimellitic anhydride (TMA), 1,2,5-trimellitic acid (1,2,5-ETM), biphenyltetracarboxylic dianhydride, benzophenonetetracarboxylic dianhydride, diphenylsulfonetetracarboxylic dianhydride, oxydiphthalic dianhydride (OPDA), pyromellitic dianhydride (PMDA), 4,4'-(2,2'-hexafluoroisopropylidene) diphthalic dianhydride, and the like are exemplified. After that, the polyimide-based resin synthesized above is diluted with the polar solvent, thereby preparing polyimide-based resin varnish.

(Preparation of Dispersion Liquid of Polyimide-Based Resin Particles)

Next, the polyimide-based resin varnish obtained above is further diluted with an organic solvent, a basic compound is added thereto, and then water is added thereto at room temperature under stirring. Therefore, a dispersion liquid of polyimide-based resin particles having a median diameter in a range of 50 nm or more and 400 nm or less is obtained.

(Preparation of Dispersion Liquid of Fluororesin Particles)

A commercially available dispersion of fluororesin particles is diluted with water and then stirred, thereby obtaining a dispersion liquid of fluororesin particles having a median diameter in a range of 50 nm or more and 500 nm or less.

(Preparation of Electrodeposition Liquid)

The dispersion liquid of the polyimide-based resin particles and the dispersion liquid of the fluororesin particles are mixed together, thereby obtaining an electrodeposition liquid.

(Electrodeposition)

As a method for electrodepositing the electrodeposition liquid on the surface of the conductor, it is possible to use a method in which an opposite electrode and the conductor are immersed in the electrodeposition liquid, and then a direct-current voltage is applied using the opposite electrode as a negative electrode and the conductor as a positive electrode. The direct-current voltage applied is preferably in a range of 1 V or higher and 600 V or lower. The temperature of the electrodeposition liquid during the application of the direct-current voltage is preferably in a range of 5° C. or higher and 40° C. or lower. The application time of the direct-current voltage is preferably in a range of 0.01 seconds or longer and 300 seconds or shorter.

[Drying Step]

In the drying step S02, the electrodeposition layer-attached conductor obtained in the electrodeposition step S01 is heated, and the electrodeposition layer is dried to form an insulating film, thereby obtaining an insulating film-attached conductor (insulated conductor). The drying atmosphere of the electrodeposition layer-attached conductor is not particularly limited and may be an atmospheric atmosphere or an inert atmosphere.

The drying temperature is a temperature in a range of (the melting point of the fluororesin particles−40° C.) to (the melting point of the fluororesin particles+30° C.). In addition, the drying temperature is preferably in a range of 300° C. or higher and 350° C. or lower. When the electrodeposition layer-attached conductor is heated at this temperature, the fluororesin particles in the electrodeposition layer melt or soften, and the fluororesin present on the surface of the conductor moves to the outside, whereby a fluorine concentration gradient layer is generated. The drying time fluctuates depending on factors such as the drying temperature, the size of the conductor, and the thickness of the electrodeposition layer, but is generally in a range of five minutes or longer and 10 minutes or shorter.

In addition, in the drying step S02, the electrodeposition layer-attached conductor may be dried at a temperature lower than the melting point of the fluororesin particle of 200° C. by less than 40° C. as preliminary drying before heated at a temperature in a range of (the melting point of the fluororesin particles−40° C.) to (the melting point of the fluororesin particles+30° C.). When the preliminary drying temperature is in this range, it is possible to efficiently dry the electrodeposition layer without moving the fluororesin particles to the surface of the film. The preliminary drying and the subsequent drying are preferably continuously carried out using the same heating device. The preliminary drying time fluctuates depending on factors such as the drying temperature, the size of the conductor, and the thickness of the electrodeposition layer, but is generally in a range of one minute or longer and 10 minutes or shorter, preferably five minutes or longer, and particularly preferably in a range of five minutes or longer and 10 minutes or shorter.

According to the insulated conductor 10 of the present embodiment configured as described above, the fluorine-containing resin composition layer 13 of the insulating film 12 includes the cured product of the thermosetting resin and the fluororesin, and thus the relative permittivity decreases. Therefore, the partial discharge inception voltage of the insulating film 12 becomes high. In addition, the fluorine concentration gradient layer 14 disposed between the conductor 11 and the fluorine-containing resin composition layer 13 is provided with the concentration gradient in which the fluorine atom content decreases from the fluorine-containing resin composition layer side toward the conductor, and the fluorine concentration gradient layer 14 has a common composition with the fluorine-containing resin composition 13 on the fluorine-containing resin composition layer 13 side, and thus the adhesion to the fluorine-containing resin composition layer 13 becomes favorable, and a crack is not easily generated between the fluorine-containing resin composition layer 13 and the fluorine concentration gradient layer 14. Furthermore, the fluorine-containing resin composition layer 13 and the fluorine concentration gradient layer 14 include the cured product of the thermosetting resin and are thus not easily distorted by heat and are capable of maintaining favorable adhesion between the fluorine-containing resin composition layer 13 and the fluorine concentration gradient layer 14 even at a high temperature. On the other hand, the content of the fluororesin having poor adhesion to the conductor 11 is low on the conductor 11 side, and thus the adhesion to the conductor 11 becomes favorable. Therefore, the adhesion between the insulating film 12 and the conductor 11 improves.

In the insulated conductor 10 of the present embodiment, the thermoplastic resin is used as the fluororesins included in the fluorine-containing resin composition layer 13 and the fluorine concentration gradient layer 14, whereby heating facilitates the movement of the fluororesins toward the surface side of the insulating film 11, and thus the content of the fluororesin on the conductor 11 side of the fluorine concentration gradient layer 14 more reliably becomes low, and it is possible to make the adhesion between the insulating film and the conductor more favorable.

In the insulated conductor 10 of the present embodiment, the fluorine-containing resin composition layer 13 is provided with a discontinuous sea-island structure made up of the sea phase including the cured product of the thermosetting resin and the island phase including the fluororesin dispersed in the sea phase, whereby a crack between the cured product of the thermosetting resin and the fluororesin in the fluorine-containing resin composition layer 13 does not easily grow, and it is possible to make the generation of a large crack more difficult.

In the insulated conductor 10 of the present embodiment, the fluorine atom content at the place with the lowest fluorine atom content in the fluorine concentration gradient layer 14 is set to be lower than the fluorine atom content in the central region in the thickness direction of the fluorine-containing resin composition layer by 10 atom % or more to increase the difference in the fluorine atom content between the fluorine-containing resin composition layer 13 and the fluorine concentration gradient layer 14, whereby it is possible to reliably improve the adhesion between the insulating film 12 and the conductor 11.

In the insulated conductor 10 of the present embodiment, the fluorine atom content at the place with the lowest fluorine atom content in the fluorine concentration gradient layer 14 is set to 15 atom % or less, whereby it is possible to further improve the adhesion between the insulating film 12 and the conductor 11.

In the insulated conductor 10 of the present embodiment, the place with the lowest fluorine atom content in the fluorine concentration gradient layer 14 is formed as close to the surface of the conductor 11 as 3 μm or less, whereby it is possible to further improve the adhesion between the insulating film 12 and the conductor 11.

In the insulated conductor 10 of the present embodiment, the fluorine atom content in the central region in the thickness direction of the fluorine-containing resin composition layer 13 is set in a range of 20 mass % or more and 70 mass % or less, whereby it is possible to reliably decrease the relative permittivity, and thus it is possible to reliably increase the partial discharge inception voltage.

In the insulated conductor 10 of the present embodiment, the fluorine-containing resin composition layer 13 and the fluorine concentration gradient layer 14 are formed as a continuous phase to make the fluorine-containing resin composition layer 13 and the fluorine concentration gradient layer 14 not easily exfoliate from each other, whereby it is possible to further improve the adhesion between the insulating film 12 and the conductor 11.

In the insulated conductor 10 of the present embodiment, the thickness of the fluorine concentration gradient layer 14 is set in a range of 2 μm or more and 15 μm or less, whereby it is possible to improve both the adhesion between the conductor 11 and the fluorine concentration gradient layer 14 and the adhesion between the fluorine concentration gradient layer 14 and the fluorine-containing resin composition layer 13, and thus it is possible to further improve the adhesion between the insulating film 12 and the conductor 11.

In addition, according to the insulated conductor manufacturing method of the present embodiment, in the drying step S02, the electrodeposition layer-attached conductor is heated and dried at a temperature in a range of (the melting point of the fluororesin particles−40° C.) to (the melting point of the fluororesin particles+30° C.), and thus it is possible to move the fluororesin present on the surface of the conductor to the outside, whereby it is possible to manufacture an insulating film-attached conductor (insulated conductor) having the fluorine-containing resin composition layer 13 and the fluorine concentration gradient layer 14.

Furthermore, in the insulated conductor manufacturing method of the present embodiment, the heating time in the drying step S02 is set to five minutes or longer, and thus it is possible to move a larger amount of the fluororesin present on the surface of the conductor to the outside, whereby it becomes possible to more reliably manufacture an insulated conductor having a fluorine-containing resin composition layer and a fluorine concentration gradient layer.

Hitherto, the embodiment of the present invention has been described, but the present invention is not limited thereto and can be appropriately modified within the scope of the technical concept of the invention.

For example, in the insulated conductor 10 of the present embodiment shown in FIG. 1, the fluorine concentration gradient layer 14 is formed so as to cover the entire surface of the conductor 11, but the configuration is not limited to this case. Specifically, the fluorine concentration gradient layer 14 may be formed so as to be in contact with a part of the surface of the conductor 11. In addition, in the insulated conductor 10 of the present embodiment, an adhesive layer may also be provided between the conductor 11 and the insulating film 12 in order to further improve the adhesion between the conductor 11 and the insulating film 12. The adhesive layer is preferably a layer singly including the thermosetting resin included in the insulating film 12.

In addition, in order to improve the lubricity of the insulated conductor 10, a high-concentration fluorine-containing resin composition layer including a thermosetting resin and a fluororesin and having a fluorine atom content relatively higher than that of the fluorine-containing resin composition layer 13 may also be provided on the outer circumferential surface of the fluorine-containing resin composition layer 13 of the insulating film 12. Furthermore, a fluororesin-only layer singly including a fluororesin may also be provided on the outer circumferential surface of the high-concentration fluorine-containing resin composition layer.

EXAMPLES

Next, the action and effect of the present invention will be described in more detail using examples.

Invention Example 1

[Synthesis of Polyimide-Based Resin Varnish]

First, in a two-liter four-neck flask including a stirrer, a cooling pipe, a nitrogen introduction pipe, and a thermometer, N-methyl-2-pyrrolidone (747 g) as an organic solvent, 4,4'-diphenylmethane isocyanate (298 g, 1.19 mol) as an isocyanate component, and trimellitic anhydride (227 g, 1.18 mol) as an acid component were injected and heated up to 130° C. The components were reacted at this temperature for approximately four hours, thereby obtaining a polyamide-imide resin (PAI) having a number-average molecular weight of 17,000. After that, the polyamide-imide resin synthesized above was diluted using N-methyl-2-pyrrolidone as an organic solvent such that the concentration of the polyamide-imide resin (non-volatile component) reached 20 mass %, thereby obtaining polyamide-imide varnish (polyamide-imide resin:N-methyl-2-pyrrolidone=20 mass %:80 mass %).

[Preparation of Polyimide-Based Resin Particle Dispersion Liquid]

Next, the polyamide-imide varnish obtained above (62.5 g) was further diluted with N-methyl-2-pyrrolidone (140 g), tri-n-propylamine (0.5 g) which is a basic compound was added thereto, and then, while stirring this liquid at a high speed of a rotation speed of 10,000 rpm, water (47 g) was added thereto at normal temperature (25° C.). Therefore, a dispersion liquid of polyamide-imide resin particles having a median diameter of 160 nm (polyamide-imide resin particles:N-methyl-2-pyrrolidone:water:tri-n-propylamine=5 mass %:76 mass %:18.8 mass %:0.2 mass %) (250 g) was obtained.

[Preparation of Fluororesin Particle Dispersion Liquid]

A commercially available perfluoroalkoxy fluororesin (PFA) dispersion was diluted with water and then stirred, thereby obtaining a PFA particle dispersion (median diameter: 200 nm, PFA particle:water=30 mass %:70 mass %).

[Preparation of Electrodeposition Liquid for Fluororesin and Polyamide-Imide Resin-Complexed Coating]

The polyamide-imide resin (PAI) particle dispersion liquid (60 g) and the fluororesin (PFA) particle dispersion liquid (10 g) were mixed together, thereby obtaining an electrodeposition liquid (PAT particles:PFA particles:N-methyl-2-pynolidone:water:tri-n-propylamine=4.3 mass %:4.3 mass %:65 mass %:26.2 mass %:0.2 mass %).

[Production of Insulated Copper Wire]

An insulated copper wire was produced using the electrodeposition liquid prepared above. Specifically, first, the electrodeposition liquid was retained in an electrodeposition tank, and the temperature of the electrodeposition liquid in this electrodeposition tank was set to 20° C. Next, in a state in which a copper wire (conductor) having a length of 300 mm and a diameter of 1 mm was used as a positive electrode, a cylindrical copper plate inserted into the electrodeposition liquid in the electrodeposition tank was used as a negative electrode, and a direct-current voltage of 100 V was applied between the copper wire and the cylindrical copper plate, the copper wire and the cylindrical copper plate were held in the electrodeposition liquid in the electrodeposition tank for 30 seconds. Therefore, an electrodeposition layer-attached copper wire having an electrodeposition layer formed on the surface of the copper wire was obtained. Next, the electrodeposition layer-attached copper wire was injected into a muffle furnace and heated under conditions of being heated at 250° C. for five minutes and then heated at 300° C. for five minutes to dry the electrodeposition layer, thereby obtaining a copper wire having an insulating film having a thickness of 45 µm formed on a surface. This insulating film-attached copper wire (insulated copper wire) was regarded as Invention Example 1.

Comparative Example 1

An insulated copper wire of Comparative Example 1 having an insulating film having a thickness of 45 µm formed on a surface was obtained in the same manner as in Invention Example 1 except for the fact that the electrodeposition layer-attached copper wire was heated at 250° C. for five minutes and then not heated at 300° C.

Comparative Example 2

An insulated copper wire of Comparative Example 2 having an insulating film having a thickness of 45 µm formed on a surface was obtained in the same manner as in Invention Example 1 except for the fact that a polyimide-based resin particle dispersion liquid was used as the electrodeposition liquid instead of the electrodeposition liquid for fluororesin and polyamide-imide resin-complexed coating and the electrodeposition layer-attached copper wire was heated at 250° C. for five minutes and then not heated at 300° C.

[Evaluation]

For the obtained insulated copper wires (insulated conductors), the element distributions and fluorine atom contents of the insulating film, the friction coefficient, and the flexibility were measured using the following methods.

(Element Distributions and Fluorine Atom Contents of Insulating Film)

Figure 3A:
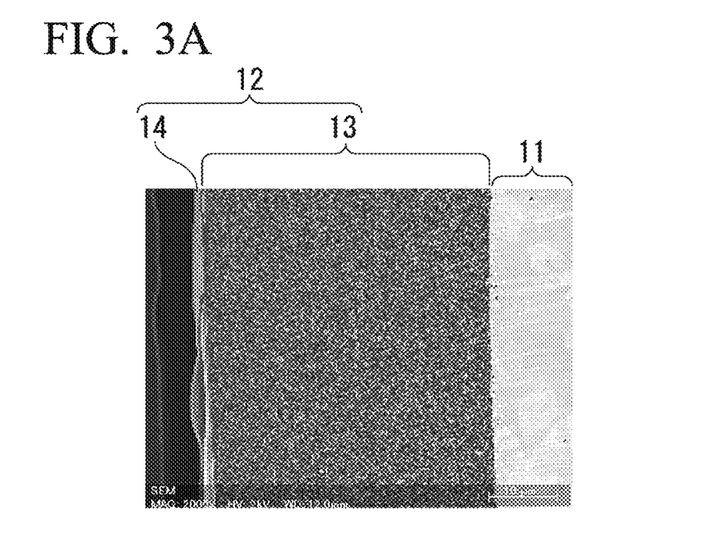
FIG. 3A is a SEM photograph of a cross section of an insulating film of an insulated copper wire obtained in Invention Example 1.
Figure 3B:
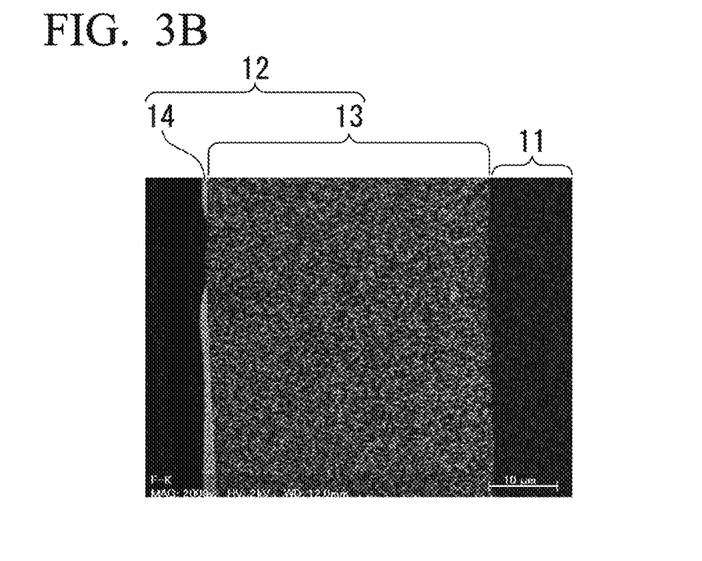
FIG. 3B is an element mapping image of a fluorine atom in the cross section of the insulating film of FIG. 3A.
Figure 4:
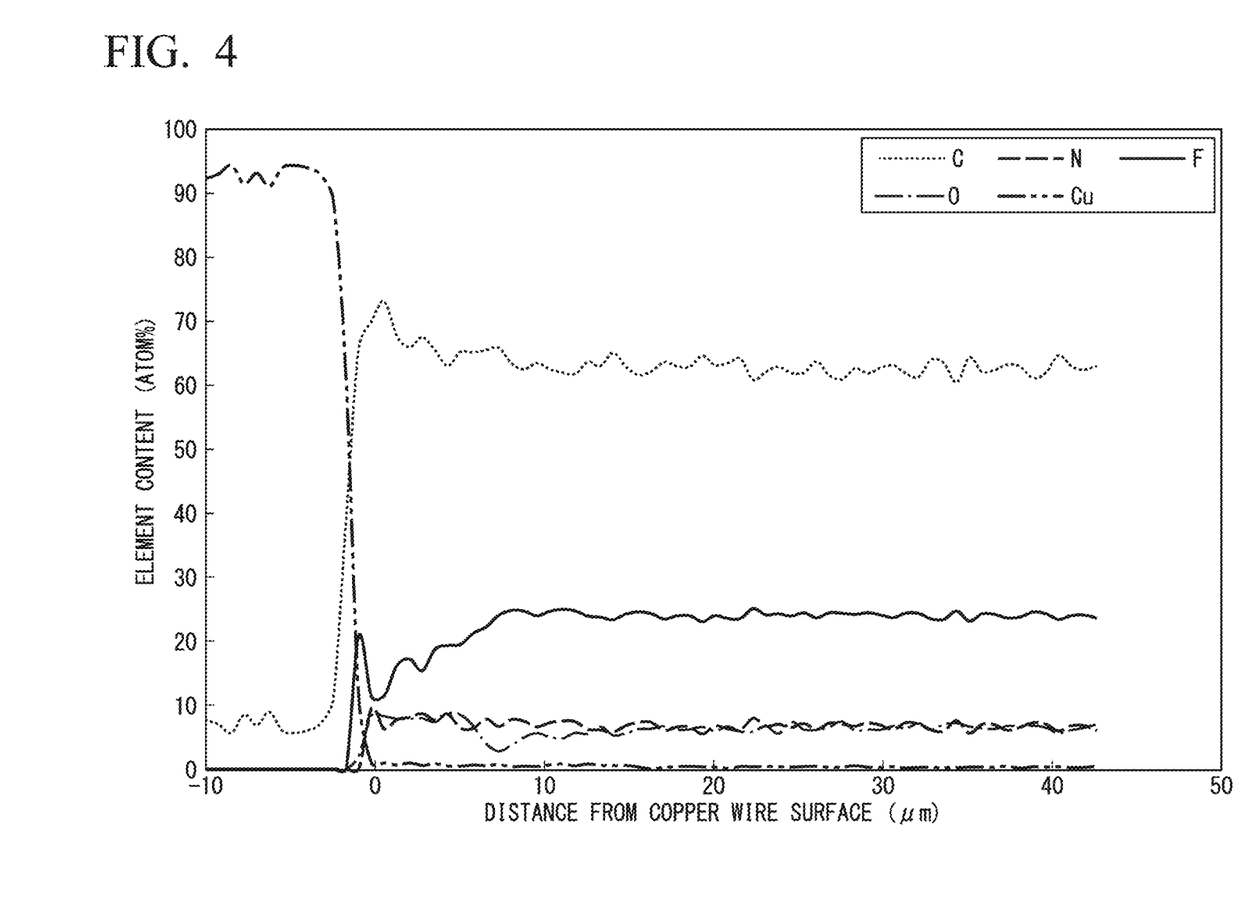
FIG. 4 is a graph showing element distributions in a thickness direction of the insulating film of the insulated copper wire obtained in Invention Example 1.

The copper wire was buried in a resin and polished to obtain a cross section, and then a SEM photograph of the insulating film cross section of the insulated copper wire and an element mapping image of the fluorine atom in the insulating film cross section were captured using a SEM-EDS analyzer (manufactured by Hitachi High-Technologies Corporation, electron microscope SU8230). In addition, from the obtained SEM photograph and element mapping image, whether or not the fluorine-containing resin composition layer and the fluorine concentration gradient layer were formed in the insulating film or whether or not the fluorine concentration gradient layer was not formed and the insulating film was a single layer of an insulating layer (fluorine-containing resin composition layer) was confirmed. In addition, regarding individual elements of fluorine (F), carbon (C), nitrogen (N), oxygen (O), and copper (Cu) in the insulating film of the insulated copper wire, the element contents in the case of regarding the total number of atoms as 100 atom % were linearly analyzed, and the element distributions in the thickness direction of the insulating film were confirmed. In addition, the thickness of the fluorine concentration gradient layer was measured from the fluorine contents obtained by the linear analysis, the lowest fluorine atom content of the fluorine concentration gradient layer was extracted, and the fluorine content of the insulating layer (fluorine-containing resin composition layer) was computed. As the fluorine content of the insulating layer, the average value of the fluorine contents in the central region of the insulating layer was used. The results are shown in FIG. 3, FIG. 4, and Table 1.

(Relative Permittivity)

The relative permittivity was obtained by computing the permittivity from the electrostatic capacity of the insulating film and the film thickness of the insulating film using an LCR meter (manufactured by Hioki E. E. Corporation) and dividing this permittivity by the permittivity $\varepsilon 0$ (8.85×10-12 F/m) of a vacuum. The film thickness of the insulating film was measured using a micrometer (manufactured by Mitutoyo Corporation). The results are shown in Table 1.

(Adhesion (Floating Length))

The adhesion was measured on the basis of "5.5 Adhesion test" of a method regulated by JIS C 3216-3 (Winding wires—Test methods—Part 3: Mechanical properties). A cut reaching the surface of the copper wire from the surface of the insulating film was provided in the center in the length direction of the insulated copper wire (length: 300 mm, diameter: 1 mm), then, the test specimen was stretched using a precision universal/tensile tester (manufactured by Shimadzu Corporation, AUTOGRAPH AGS-10kNX) at a speed of 5±1 mm per second such that the stretch ratio reached 15%, then, the surrounding of the cut provided to the insulated copper wire was observed, and the length of the insulating film floating from the copper wire (floating length) was measured. The floating lengths were measured throughout the entire surface of the insulated copper wire, and the maximum length of the measured floating lengths was shown in Table 1.

TABLE 1

| | Composition of electrodeposition liquid | | | | | Evaluation | | | | |
|---|---|---|---|---|---|---|---|---|---|---|
| | Thermosetting resin particles | | Fluororesin particles | | | Drying condition of electrodeposition layer-attached copper wire | Fluorine concentration gradient layer | | Insulating layer | | Adhesion (floating length) (mm) |
| | Kind | Content (mass %) | Kind | Content (mass %) | Melting point (° C.) | | Thickness (μm) | Lowest fluorine atom content (atom %) | Fluorine atom content (atom %) | Relative permittivity | |
| Invention Example 1 | PAI | 99.5 | PFA | 0.5 | 310 | 250° C. × 5 minutes → 300° C. × 5 minutes | 8 | 11 | 24 | 2.9 | 2 |
| Comparative Example 1 | PAI | 99.5 | PFA | 0.5 | 310 | 250° C. × 5 minutes | Fluorine concentration gradient layer not formed | | 29 | 3.4 | 4 |
| Comparative Example 2 | PAI | 100 | Fluororesin particles not added | | | 250° C. × 5 minutes | — | — | — | 4.7 | 2 |

FIG. 3A is a SEM photograph of the insulating film cross section of the insulated copper wire obtained in Invention Example 1, and FIG. 3B is an element mapping image of a fluorine atom in the insulating film cross section. FIG. 4 is a graph showing the element distributions in the thickness direction of the insulating film of the insulated copper wire obtained in Invention Example 1. White portions in the element mapping image indicate a fluorine atom. From the SEM photograph of FIG. 3A and the element mapping image of a fluorine atom of FIG. 3B, in the insulated copper wire obtained in Invention Example 1, the formation of the fluorine-containing resin composition layer 13 and the fluorine concentration gradient layer 14 disposed between the conductor 11 and the fluorine-containing resin composition layer 13 in the insulating film 12 was confirmed. In addition, from the graph of FIG. 4, it was confirmed that, in the fluorine-containing resin composition layer and the fluorine concentration gradient layer, the distributions of the individual elements changed continuously, and a continuous phase was formed. In contrast, in the insulated copper wire obtained in Comparative Example 1 in which the drying temperature of the electrodeposition layer-attached copper wire was as low as 250° C. (the melting point of PFA particles–60° C.), the fluorine concentration gradient layer was not formed in the insulating film, and the insulating film was a single layer of an insulating layer.

In addition, as shown in Table 1, when the insulated copper wire of Comparative Example 1 provided with the single layer of the insulating film including the polyamide-imide resin and the fluororesin and the insulated copper wire of Comparative Example 2 provided with the single layer of the insulating film singly including the polyamide-imide resin are compared with each other, the relative permittivity became lower in the insulated copper wire of Comparative Example 1. On the other hand, it was confirmed that, regarding the adhesion, the floating length was shorter and more favorable in the insulated copper wire of Comparative Example 2.

In contrast, it was confirmed that, in the insulated copper wire of Invention Example 1 in which the insulating film had the fluorine concentration gradient layer, the relative permittivity was, similar to the insulated copper wire of Comparative Example 1, suppressed to be low, and the adhesion was, similar to the insulated copper wire of Comparative Example 2, favorable.

(Structure of Fluorine-Containing Resin Composition Layer)

Figure 5:
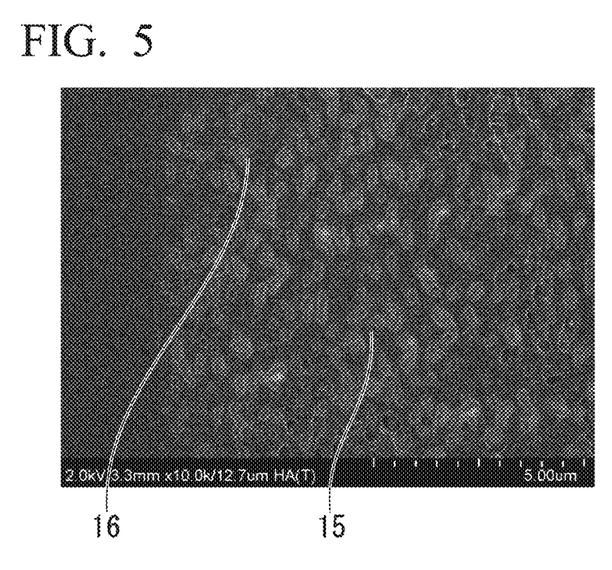
FIG. 5 is a SEM photograph of a fluorine-containing resin composition layer configuring the insulating film of the insulated copper wire obtained in Invention Example 1.

For the insulated copper wire of Invention Example 1, the structure of the fluorine-containing resin composition layer was confirmed using a SEM-EDS analyzer (manufactured by Hitachi High-Technologies Corporation, electron microscope SU8230). The result is shown in FIG. 5. From a SEM photograph of FIG. 5, it was confirmed that the fluorine-containing resin composition layer had a sea-island structure made up of a sea phase 15 including the polyamide-imide and an island phase 16 including the fluororesin dispersed in the sea phase 15.

INDUSTRIAL APPLICABILITY

In the insulated conductor of the present invention, the partial discharge inception voltage is high, the adhesion between the insulating film and the conductor is excellent, and a crack is not easily generated, and thus the insulated conductor can be advantageously used as electric coils for a variety of electric devices such as a motor or a transformer. In addition, it is possible to manufacture in an industrially advantageous manner an insulated conductor in which the partial discharge inception voltage is high, the adhesion between the insulating film and the conductor is excellent, and a crack is not easily generated using the insulated conductor manufacturing method of the present invention.

REFERENCE SIGNS LIST

10 Insulated conductor
11 Conductor
12 Insulating film
13 Fluorine-containing resin composition layer
14 Fluorine concentration gradient layer
15 Sea phase
16 Island phase

The invention claimed is:

1. An insulated conductor comprising:
a conductor; and
an insulating film provided on a surface of the conductor, wherein the insulating film includes a fluorine-containing resin composition layer including a cured product of a thermosetting resin and a fluororesin and a fluorine concentration gradient layer which is disposed between the conductor and the fluorine-containing resin composition layer, includes a cured product of a thermosetting resin and a fluororesin, and is provided with a concentration gradient in which a fluorine atom content decreases from the fluorine-containing resin composition layer side toward the conductor.

2. The insulated conductor according to claim 1, wherein the fluororesin included in the fluorine-containing resin composition layer is a thermoplastic resin, and the fluororesin included in the fluorine concentration gradient layer is a thermoplastic resin.

3. The insulated conductor according to claim 1, wherein the fluorine-containing resin composition layer has a sea-island structure made up of a sea phase including the cured product of the thermosetting resin and an island phase including the fluororesin dispersed in the sea phase.

4. The insulated conductor according to claim 1, wherein a difference between a fluorine atom content at a place with a lowest fluorine atom content in the fluorine concentration gradient layer and a fluorine atom content in a central region in a thickness direction of the fluorine-containing resin composition layer is 10 atom % or more.

5. The insulated conductor according to claim 1, wherein a fluorine atom content at a place with a lowest fluorine atom content in the fluorine concentration gradient layer is 15 atom % or less.

6. The insulated conductor according claims 1, wherein a place with a lowest fluorine atom content in the fluorine concentration gradient layer is in a range of 3 μm or less from the surface of the conductor.

7. The insulated conductor according to claim 1, wherein a fluorine atom content in a central region in a thickness direction of the fluorine- containing resin composition layer is in a range of 20 mass % or more and 70 mass % or less.

8. The insulated conductor according to claim 1, wherein the fluorine-containing resin composition layer and the fluorine concentration gradient layer are a continuous phase.

9. The insulated conductor according to claim 1, wherein a thickness of the fluorine concentration gradient layer is in a range of 2 μm or more and 15 μm or less.

10. An insulated conductor manufacturing method for manufacturing the insulated conductor according to claim 1, the method comprising:
an electrodeposition step of electrodepositing an electrodeposition liquid including thermosetting resin particles and fluororesin particles to a surface of the conductor to obtain an electrodeposition layer-attached conductor; and
a drying step of heating and drying the electrodeposition layer-attached conductor at a temperature in a range of (a melting point of the fluororesin particles −40° C.) to (the melting point of the fluororesin particles +30° C.).

11. The insulated conductor manufacturing method according to claim 10,
wherein a heating time in the drying step is five minutes or longer.

* * * * *